L. C. WETZEL.
WEIGHING SCALE.
APPLICATION FILED SEPT. 25, 1911.
1,367,220.
Patented Feb. 1, 1921.
3 SHEETS—SHEET 1.
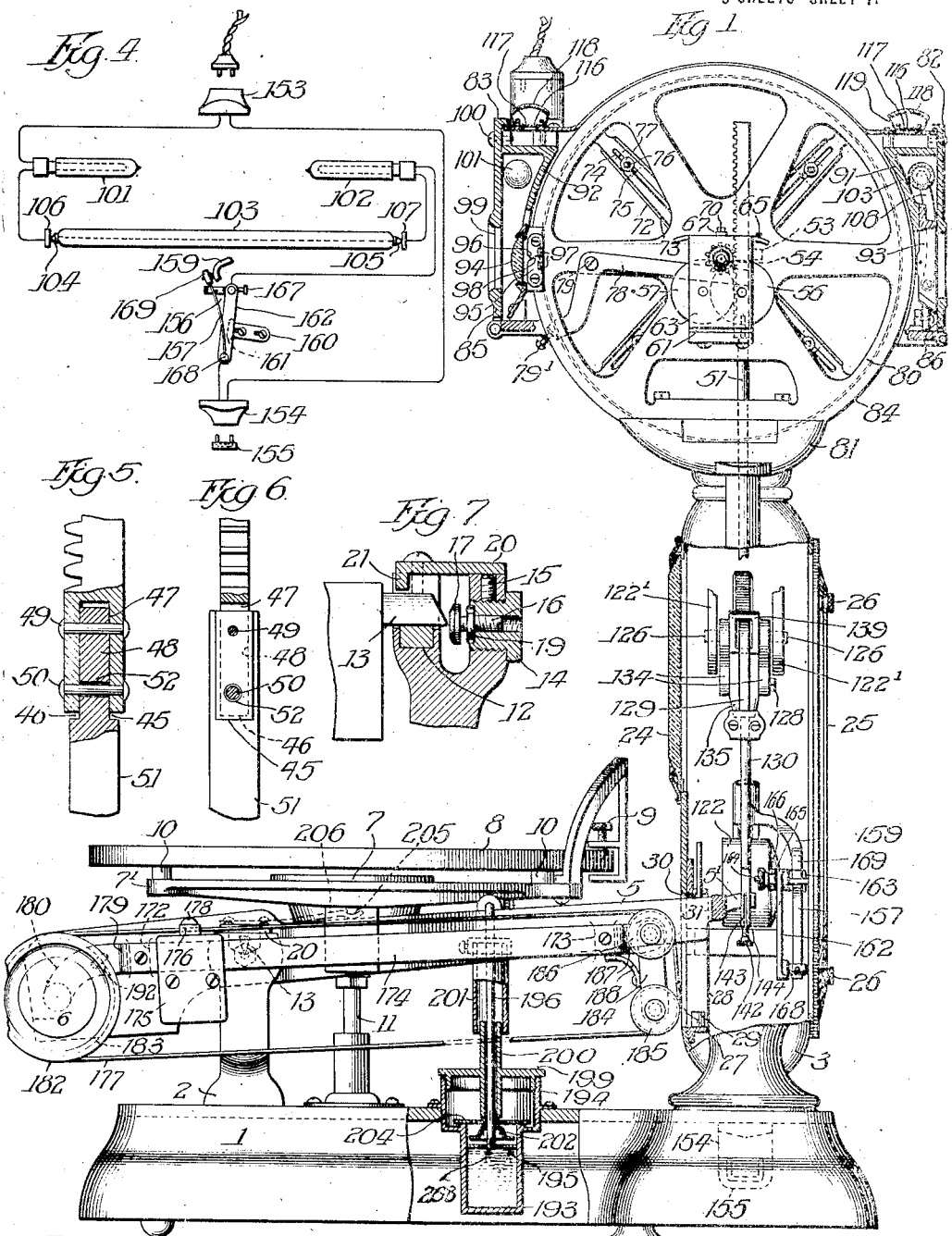

L. C. WETZEL.
WEIGHING SCALE.
APPLICATION FILED SEPT. 25, 1911.
1,367,220.
Patented Feb. 1, 1921.
3 SHEETS—SHEET 2.
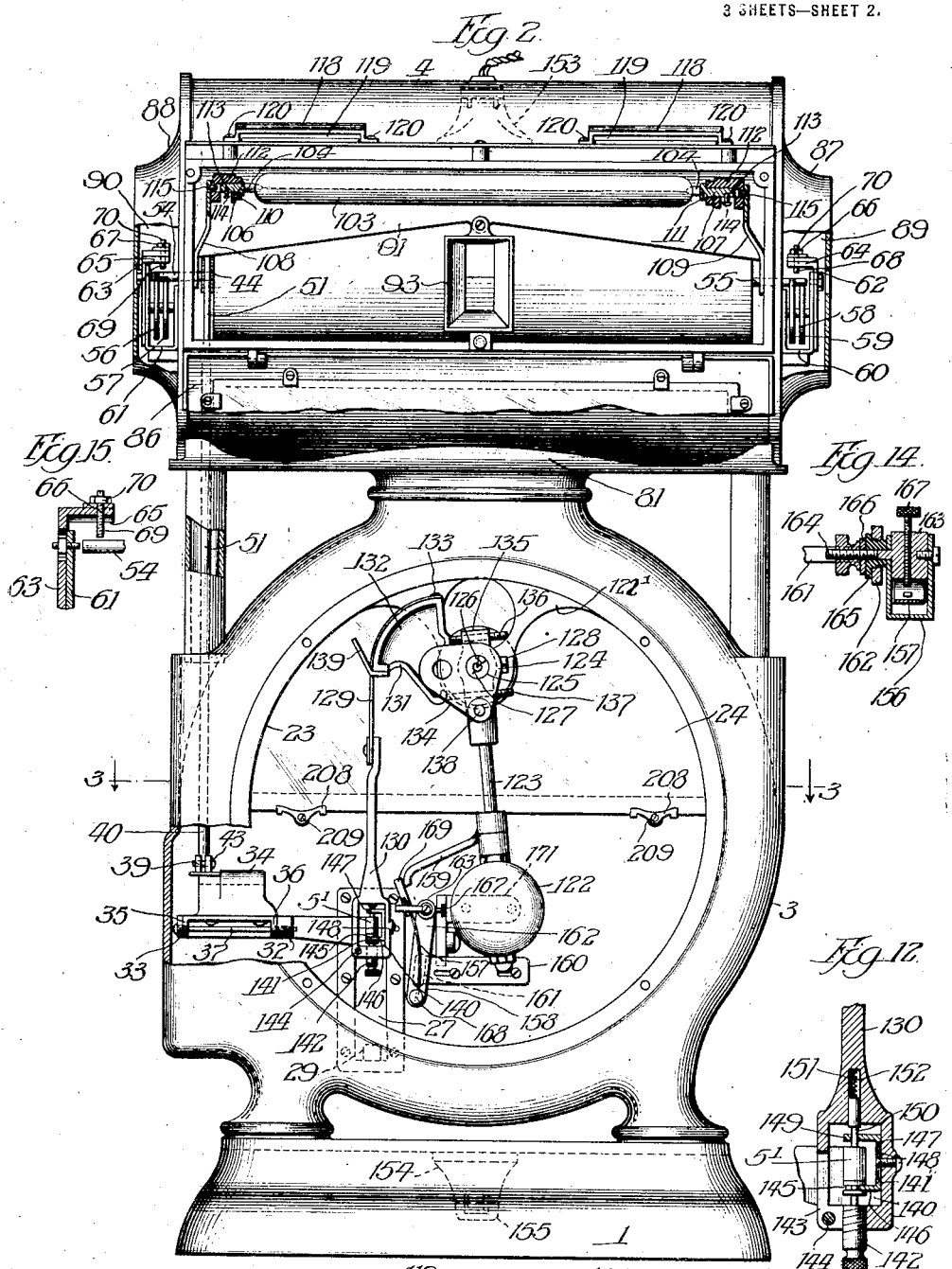

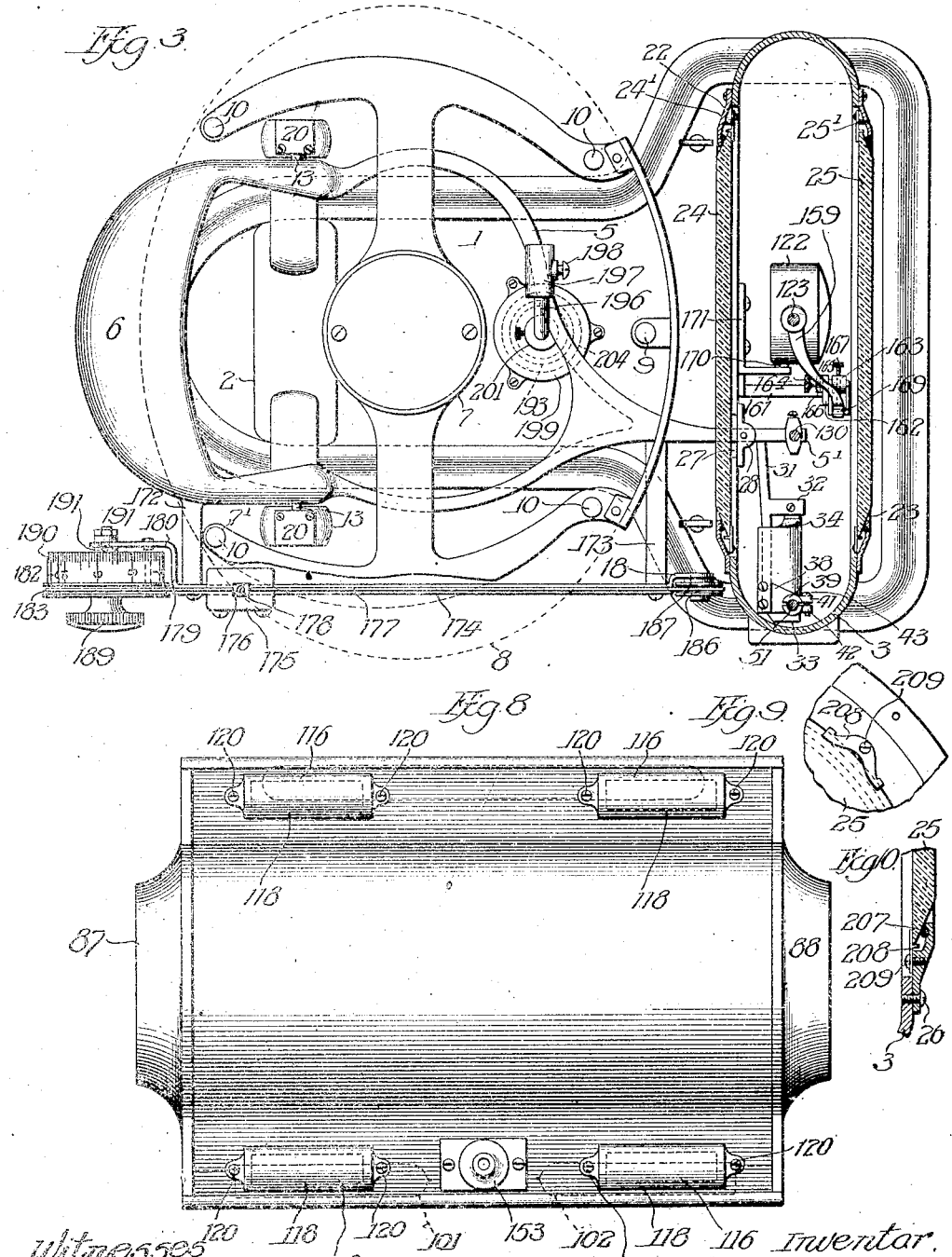

UNITED STATES PATENT OFFICE.

LEWIS CALVIN WETZEL, OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,367,220.          Specification of Letters Patent.     Patented Feb. 1, 1921.

Application filed September 25, 1911. Serial No. 651,071.

*To all whom it may concern:*

Be it known that I, LEWIS C. WETZEL, a citizen of the United States, residing at Toledo, in the county of Lucas and State of Ohio, have invented certain new and useful Improvements in Weighing-Scales, of which the following is a specification.

My invention relates more particularly to that class of weighing scales employing a pendulum as the variable counterbalance for the load of commodity being weighed and a rotary cylinder value-indicating chart having a series of annular rows of numerals, each row representing values of progressively greater weights of materials at a uniform price per unit of weight and the several rows representing values at proportionately increasing prices per unit of weight; but it will be obvious from the following detailed description that certain features of my invention are applicable to scales of other types than that above referred to and though I have described my invention in connection with a rotary cylinder computing pendulum scale I have done so merely for the purpose of illustration so far as many of the features of my invention are concerned and it will be understood that I am not limited to this particular form of scale except in so far as it may form a feature of the following claims which point out the true scope of my invention and are intended as a measure thereof, due allowance being made for equivalents.

Referring now to the drawings accompanying and forming a part of this application, Figure 1 is a vertical elevation of a computing pendulum scale embodying my invention, parts, however, being broken away and other parts shown in section and the casing of the computing chart being shown with one end removed for the purpose of disclosing the interior mechanism; Fig. 2 is a rear elevation of the scale, parts being broken away and shown in section as in Fig. 1 and for a like purpose; Fig. 3 is a section upon the line 3—3 of Fig. 2, parts being broken away to show the construction; Fig. 4 is a diagrammatic representation of the wiring installed in connection with the electric lamps which I employ for illuminating my scale; Figs. 5 and 6 are details at right angles to each other partly in section of the portion of the rack by which the chart is operated; Fig. 7 is a vertical section of one of the main bearings or fulcra of the beam; Fig. 8 is a top plan of the chart casing showing certain parts in dotted lines; Figs. 9 and 10 are details, the former in front elevation and the latter in section of the means for securing certain panes of glass in the casing of the scale. Figs. 11–15 refer to various details to which reference will be made below.

In the following detailed description like numerals are used throughout to designate the same part of the device. In the particular embodiment of my invention shown, the base 1 is provided near one end with standards 2 which carry at their upper ends the bearings for the support of the main beam and at its other end the base sustains a substantially watch-shaped casing 3 surmounted by a cylindrical casing 4. The beam consists of an irregular casting 5 weighted at the end 6 (see Fig. 3) and supporting between its fulcra and its other end a commodity receiver 7 which is or may be pivoted or supported upon the beam in the usual way by knife edge bearings. The commodity receiver may consist of the usual casting 7' supporting a disk 8 of glass or other suitable material clamped in place by means of the thumb screw 9 and resting upon supports 10 projecting upwardly from the casting. To preserve its substantially horizontal position, the casting 7' is provided with a downwardly projecting rod or stud 11 which is pivoted within the base 1 to a check link of any approved construction not shown. The features just referred to are common and well-known in this art and need not be specifically described. The long end of the beam which carries the commodity support projects into the casing 3 within which it is connected to a rack bar, which latter engages at its upper end a pinion upon the rotary chart as is not uncommon in devices of this character.

The upper ends of the standards 2 are recessed as at 12 (see Fig. 7) for the reception of agates and the latter are provided with the usual V-shaped grooves for the reception of the knives 13 of the beam. At a point substantially opposite the knife bearing, each standard is provided with a tapped opening, receiving screw 14 which is adjustable in said opening and may be locked in adjusted position by a set screw 15. The screw 14 is in turn bored and tapped concentrically to receive a screw 16 which bears upon its inner end a head 17 of hardened steel which may be adjusted with relation to the screw 14. A lock nut 19 secures the screw 16 in adjusted position with relation to screw 14. The cavity in the standard is closed by a cap plate 20 having a flange 21 at one edge which depends within the side walls of the cavity over the knife edge. It will be readily understood that lateral motion or play of the beam may be prevented by adjusting the heads 17 with relation to the screw 14 so that when the latter are driven home or into their ultimate position the heads 17 barely clear the ends of the knives 13 and prevent endwise movement thereof. The cap plate forms with the walls of the cavity substantially a complete closure, so that the bearing is as nearly dust proof as is compatible with the rocking of the knives.

The watch-shaped casing 3 is formed on its front and rear faces respectively with windows 22—23, the latter of which is substantially circular and the former semi-circular, and each of these openings is closed by a pane of glass 24—25, secured in a suitable metal frame 24', 25', which is attached to the casing by screws as 26. The casing is also formed with a vertically elongated slot 27, within which swings the end of the beam, and which is surrounded by a flanged frame 28, carrying cushions 29—30 which limit movement of the beam at the opposite ends of its swing. Within the casing 3 the beam is provided with an offset arm 31 (see Figs. 2 and 3) to which are secured the connections for operating the cylinder chart. For this purpose the arm 31 is formed by casting or otherwise with brackets 32—33 between which is pivoted a rocking element 34 provided with depending ears 35—36 through which and the brackets 31—32 extends a journal pin 37. (Fig. 2.) To the rocking element 34 is secured a plate spring 38 which bears at its outer end a split socket 39 which receives the lower end of the rack bar 40 for driving the cylinder chart. The members of this split socket are provided with ears 41—42 which receive a screw 43 by which the socket is clamped about the rack bar. The latter element engages at its upper end a pinion 44 upon the shaft of the chart cylinder (see Fig. 1) and is jointed intermediate its ends, as shown more particularly in detailed views (Figs. 5 and 6), to permit slight adjustment with reference to the teeth of the pinion. As shown in the detailed views the lower member is slabbed off at opposite sides at 45—46 and the upper member is slotted as at 47 to receive the reduced end 48 of the lower member and the two members are pivoted by the pin 49 and held in general alinement by the pin 50 which, however, is permitted a slight movement with reference to the lower member 51 by reason of the loose fit of the pin in the opening 52. By this provision the rack is prevented from binding upon the pinion in case of a slight inaccuracy of adjustment of the parts. The upper end of the rack bar is guided and held in operative relation to the pinion by means of a guide member 53.

The journals 54—55 of the cylinder chart rest and rotate upon pairs of over-lapping anti-friction wheels or disks 56, 57, 58 and 59, the members of each pair being pivoted upon opposite sides of and beneath the journals, as shown more especially in Fig. 1, and are spaced from each other laterally as shown in Fig. 2 to permit independent rotation notwithstanding the lap thereof, as shown in Fig. 1. The journals of the anti-friction disks are mounted in the walls of U-shaped bracket pieces 60—61 secured to the ends of the casing in any suitable manner and provided with protecting cover plates 62—63 (Figs. 1. 2 and 15) which overlie the ends of the axles of the anti-friction disks and the journals of the chart cylinder. These plates 62—63 are also shown with rectangular extensions 64—65 which extend inwardly and above the bearing members as a further protection against dust and are tapped at 66—67 to receive screws 68—69 which are adjusted to just clear the axles of the journals of the chart cylinder to prevent the latter from jumping from their proper position in case of a violent movement imparted to the pinion. Locking nuts 70, 70' secure the screws in their adjusted position. By the specific construction just described the journals are to a large extent protected from dust and foreign substances and dislocation thereof is also prevented.

The rotary cylindrical chart is in the main of the ordinary construction comprising the cylindrical member 71 shown in dotted lines in Fig. 1 supported at either end by a spider comprising the thin sheet metal arms 72. The spider may be secured to the bearing shaft in any well-known manner, and the arms thereof are flanged as at 73 (Fig. 1) to provide greater rigidity, and slotted as at 74 for the reception of small weights 75, which are secured to the arms in adjusted position by means of screws 76, passing through washers 77 and tapped into the weights 75. It is essential in charts of this character that they be poised with great nicety with regard to their axes, otherwise there is a tendency to rotation toward a favored position and consequent interference with correct weighing. By the provision of these adjustable weights upon the arms of the spiders, however, any inequality or overbalance of the cylinder caused by eccentricities in its construction or variations in the weights of materials or due to any other cause may be counteracted.

As shown in Fig. 1, bell crank levers 78 of thin sheet metal are pivoted to the casing at 79, there being such a lever at each end of the casing and these levers extend beneath the ends of the arbors of the chart cylinders and may be adjusted by means of screws 79' to lift the journals from their normal bearing for the purpose of shipment and in order to avoid damage to the bearing.

The cylindrical housing 4 includes a pair of end castings 80 mounted upon a support 81 which is in turn secured to the top of the watch-shaped casing 3. These end castings are open as shown in Fig. 1 and centrally bored for the passage of the cylinder shaft and are also connected by cast metal frames 82—83 extending between the end casting at the front and rear of the housing and surrounding or framing the front and rear reading positions of the chart. The casing is completed by sheet metal sheathing 84 extending between the frames 82 and 83 above and below the cylinder, hinged cover-plates 85—86 over the openings in the frames 82 and 83 and end caps 87—88 provided with glazed openings 89—90 as shown more particularly in Figs. 2 and 8. The frames 82 and 83 are formed with longitudinally extending webs 91—92 next to the chart for a purpose which will appear, and between the web 91 and the lower edge of the corresponding frame at about the longitudinal center thereof is arranged a boxing 93 which forms the sight opening at the back of the scale for the customer, the chart bearing a series of weight indications centrally thereof to register with this opening. The hinged cover plate 86 is also formed with an opening coinciding with the boxing 93 and suitably glazed to facilitate inspection of the weight numerals by the customer. In the boxing 93 upon the front of the scale, however, the sight opening extends entirely the length of the cylinder and is closed by a lens 94 through which the computation indications may be seen magnified. Upon either end casting and opposite the ends of the lens is secured a sheet metal plate 95 notched as at 96 adjacent the lens and formed at its opposite edge with a pair of struck-up ears 97 and, between these plates at the opposite ends of the cylinder, is stretched centrally of the lens a wire 98 supported at opposite ends in the notches in the plates 95 and secured around the lugs 97. This wire is properly placed to form a reading line for determining the correct reading of the chart. The swinging cover plate 85 is, of course, provided with a corresponding opening 99 extending substantially the length of the housing through which the reading of the scale may be made, and both doors are secured, when closed, by suitable screws 100.

Within the frames 82 and 83 and above the reading openings are mounted electric lamps for illuminating the chart at the reading positions. The illumination within the frame 83 is secured by a pair of incandescent lamps 101 and 102 mounted at opposite ends of the frames in sockets of any ordinary or approved construction, but the illumination within the frame 82 is obtained by means of an elongated lamp 103 extending substantially the length of the casing and containing a filament, the contacts 104—105 of which are arranged at the opposite ends of the tube containing the filament (see Figs. 1, 2 and 4). The lamp 103 is removably supported and connected by means of contacts 106—107 mounted upon leaf springs 108—109 secured to the ends of the frame (see Figs. 2 and 11). Each contact consists of a cylindrical plug of metal having a cavity 110—111 in the end thereof and mounted in an insulating member 112 which has a central bore for the reception of a contact member on the lamp. The contacts 106—107 are tapped transversely at their inner ends for the reception of screws 113 for the attachment of the leading-in wire and, in order to provide access to the screws the insulation is cut away as at 114 (see Fig. 11). The insulating member is secured to the spring by a screw 115 extending through the end thereof.

By using a lamp of the character described and mounting it in the manner above stated the entire length of the reading position of the chart is illuminated and at the same time the lamp may be readily removed by pressing outwardly the spring members carrying the contacts on the frame when it is desired to replace the lamp or to clean the structure. In order to prevent overheating the casing, I have provided four ventilating openings 116 shown in vertical cross-section in Fig. 1 and in dotted lines in Fig. 8 which are covered by wire gauze 117 (see Fig. 1) and protected by hoods 118 having sight openings 119 (see Figs. 1 and 2). As shown these hoods are made separate from the casing and secured thereto by screws 120 extending through ears on the hoods. The webs 91 and 92 heretofore mentioned protect the chart from the heat of the lamps at the positions of the charts which are directly opposite the lamps so that the rays where they strike the chart are substantially tangential thereto and somewhat remote from the sources of heat and light.

Within the casing 3 is mounted the pendulum 122 which constitutes the variable load counterbalance of the scales. This element includes a weight and a rod 123, the latter having an enlarged upper end 124, counterbored for the reception of the arbor 125 which carries the knives 126 on which the pendulum is swung from brackets 122' secured to the casing (see Fig. 2). The arbor as shown in said figure consists of a sleeve or cylinder having a central bore and a radial section of its metal removed to form a seat for the knife which extends longitudinally of the arbor and projects therefrom at opposite ends, the apex of the knife being in the axis of the arbor. If desired, to facilitate yielding thereof, the arbor may be provided with a kerf 127 opposite the removed section. The counterbore in the enlarged upper end of the pendulum rod receives the arbor with a drive fit and a screw bolt 128 tapped into the pendulum rod, bears against the arbor and prevents rotation thereof relative to the pendulum rod. Motion is transmitted from the end 5' of the main beam (see Figs. 2 and 3) to the pendulum through a strap 129 connected to the beam by a stirrup 130, and to the pendulum by a casting 131 formed with a segment 132 with which the strap directly coöperates and to which it is secured at one e d by a screw 133. The casting also comprises cheek pieces 134 which are counter-bored for the reception of the ends of the arbor 125 upon which the casting is mounted and are spaced apart a sufficient distance to receive between them the enlarged end of the pendulum rod before referred to (see dotted lines, Fig. 2). The latter is provided with an upwardly extending lug 135 which receives an adjusting screw 136 and a similar adjusting screw 137 is inserted through the rod below the arbor and knife, both such screws being arranged to bear upon flattened surfaces upon the casting 131 on opposite sides of the arbor for the purpose of adjusting the pendulum angularly with relation to the casting as plainly seen in Fig. 2 of the drawing. By this construction the position of the cam segment 132 which, as will be seen, is eccentric to the arbor, may be nicely adjusted with reference to the pendulum to secure the desired movement of the pendulum with relation to that of the beam. In order, however, to relieve the parts of strain under which they would otherwise remain by reason of the pressure of the screws 136 and 137 the cheek pieces 134 are perforated for the passage of a screw bolt 138 which passes freely through the perforation in one of the cheek pieces and through a transverse slot in the pendulum rod head and is tapped into the other cheek piece. After the parts have been adjusted to the required position by the screws 136—137, during which adjustment the bolt 138 is loose, the latter is tighened and the parts are thereby held in their adjusted position. If desired the strain on the screws 136 and 137 may then be relieved of their pressure by slightly withdrawing them. A slotted guide 139 prevents the strap 129 leaving its segment in case of a sudden motion of the parts.

The stirrup 130 is formed with the usual eye or loop 140 (see Figs. 1, 2 and 12) which embraces the end 5' of the scale beam and is provided with an adjustable seat 141 for the usual cone pivot on the beam, the screw 142 which carries the seat being tapped through the lower end of the loop, which latter is split downwardly as at 143 and provided with a set screw 144 for drawing the sections of the loop together and binding the screw 142. The inner head of the screw constituting the bearing is circumferentially grooved as at 145 and embraced by the bifurcated end 146 of a U-shaped slide 147 which is vertically guided by a pin and slot connection 148 with a side wall of the loop. The upper limb of the slide is perforated at 149 to receive the reduced end of a sliding pin 150 which reciprocates within a cavity 151 in the stirrup member and is urged downwardly by a spring 152 in the cavity as shown in Figs. 2 and 12. The purpose of the pin 150 is to prevent the cone pivot on the beam leaving its seat in the stirrup and since the projection of the pin from its cavity is limited by the slide the adjustment of the screw carrying the socket also adjusts the position of the pin with relation to the upper side of the beam. It will be understood that the slide and pin are so proportioned that when the cone pivot is properly centered in the socket the pin 150 just clears the upper face of the beam sufficiently to permit the free movement of the latter.

The precise wiring of the lamps is not material and might be worked out by any one familiar with wiring practice but it is important that sockets be provided for the attachment of leading-in wires either above or below the scale as may be desired, but in Fig. 4 I have shown diagrammatically a system of wiring suitable for my purpose. The connections of the parts are apparent from an inspection of the diagram and it is sufficient to call attention to the fact that at 153 is a connection socket which is located on top of the scale as shown in Fig. 1 and at 154 a socket attached to the bottom of the scale also indicated in Fig. 1, though in dotted lines, and when one of these sockets is in use the other is bridged, a device 155 for the purpose being shown in Figs. 1 and 4. The purpose of this part of my construction is to provide for lighting the scale only when it is put in operation and with this in view I have provided a switch 156 adapted to be opened by the pendulum which holds it open when in normal position but permits the switch to close when the pendulum is elevated as by putting a weight upon the commodity receptacle. For this purpose the switch consists of a leaf spring 157 mounted at its lower end in a bracket 158 and projecting at its upper end into the path of an arm 159 carried by the pendulum. The bracket 158 is adjustably secured to the wall of the casing by a slotted plate 160 and comprises a lateral arm 161 and an upright end member 162, the latter supporting at its upper end a post 163 which is secured to the upright member by a reduced screw-threaded end 164 formed upon the post, and projecting through a perforation in the end of the upright member from which, however, it is insulated by the insulating sleeve 165 (see Fig. 14). The reduced screw-threaded end of the post receives a nut 166 by means of which the post is secured in position and beyond the nut is provided with a thumb nut for securing one of the leading-in wires of the switch in connection with the stationary contact of the switch which is formed by an adjustable screw 167 tapped into and through the post 163. The lower end of the upright member is provided with a binding post 168 which is in electrical connection with the spring switch member 157 and the upper end of the latter, in the construction shown, is reinforced at 169 for contact with arm 159. It will be understood that the bracket 158 and the contact 167 are so adjusted that the pendulum arm 159 barely separates the spring contact from its seat when the pendulum is in its normal position, and therefore the slightest movement of the pendulum permits the switch to close, the circuit then being formed through the binding post 168, switch 157, contact 167, post 163 and binding post 164. In order to protect the mechanism a buffer 170 is provided for the pendulum, which buffer is mounted upon a bracket 171 adjustably secured to the wall of the casing.

A further feature of my invention consists in a new tare device which I will now describe as follows, reference being had to Figs. 1 and 3: The scale beam is formed or provided with supporting arms 172—173 upon which at their outer ends is mounted a guide-strip 174 extending parallel with the beam. Upon this guide is mounted to slide a tare weight 175 which may be of any desired construction but is formed at its upper end with a boss 176 through which passes an endless belt or cord 177 which has for its purpose the reciprocation of the tare weight along its guide. A set screw 178 clamps the cord or ribbon in the boss and prevents relative motion between the same and the tare weight. At one end the guide 174 is prolonged and bent at substantially right angles to the plane of its face as at 179 and again at 180 is bent parallel to the plane of the body of the guide, and upon the depressed end 181 and within the offset formed in the guide member is mounted a drum or pulley 182 provided with a groove 183 for the reception of the endless belt or cord 177. The latter, as may be here observed, is preferably a wire cable formed of a very fine wire for greater flexibility. At its other end and also beyond the travel of the tare weight the guide is provided with a hinged member 184 which depends from the end of the guide and supports a pulley 185 which serves as a guide for the lower run of the belt 177, there being a similar pulley 186 mounted upon the offset end 187 of the guide (see Fig. 3) for receiving the upper run of the belt. The pivoted member 184 is urged in a direction to keep the belt taut by a spring 188. A knob 189 is provided for turning the drum or pulley 182 and upon a flange 190 of the latter is inscribed a scale which is designed to indicate the counterbalancing effect of the tare weight at positions of the latter. A pointer 191 is suitably mounted to facilitate correct reading of the scale on the drum, and the cable is passed twice around the latter and secured at an intermediate position as at 192, Fig. 1, to prevent relative motion between the drum and the cable. It will be apparent that the drum and cable form a convenient and satisfactory means for adjusting the tare weight along the beam and the weight indication may be readily observed. The use of tare weights is so common that it is unnecessary to refer to their function further here.

A further feature of my invention relates to the dash pot for preventing too abrupt movement of the beam. My dash pot consists of a cylinder 193 having an enlarged upper end 194 and extending through and suitably attached to the base of the scale. A plunger 195 loosely fits the body of the dash pot and is connected by a rod 196 with the beam 5, the rod being bent at right angles for this purpose at its upper end as shown in Fig. 3 and inserted within a sleeve 197 upon the beam where it is secured by a set screw 198. The dash pot is provided with a cap 199 having a sleeve 200 projecting from opposite sides thereof and surrounding the plunger rod. Near the upper end of the latter is secured a sleeve 201 which surrounds the upper end of the sleeve 200 and is closed at its upper end about the plunger rod to prevent the escape of the oil or other fluid used in the dash pot. The plunger consists of a perforated disk above which is an adjustable bell 202 of smaller diameter than the cylinder and the bell and disk are adjustable toward and from each other by a screw-threaded connection 203 to regulate the flow of liquid through the plunger. Upon the shoulder formed in the cylinder by the enlargement 194 rests a perforated splash plate 204 which is permitted some slight movement but whose upper position is limited by the depending sleeve upon the cap. By reason of this splash plate the upper motion of the piston is prevented from pumping or throwing the oil upwardly in such volume and with such velocity as to cause it to overflow or splash out of the dash pot.

A further feature of my invention relates to securing the scal for shipment and is designed to prevent the injury or destruction of the bearings of the commodity receiver which frequently is occasioned by the jolts and jars to which a scale is subjected during shipment. For this purpose the spider which carries the bearings for the commodity receiver is formed with a transversely extending depending rib 205 and I provide a pair of plates 206, shown in detail in Fig. 13, which may be struck up out of sheet metal and formed near one end with a transverse groove to receive the rib 205 and provided near the other end with holes 206 so spaced and related to the cross groove 205 that, when the scale is prepared for shipment, the plates may be screwed upon the upper ends of the standards 2, using for this purpose the tapped openings by which the cover plates are secured and, when the screws, are driven home, the outer ends of the plates bear against the ribs 205 and lift the bearings from the knives.

In order to prevent the breakage of the glass panes which cover the openings in the casing, I form upon the inside of the frame members 24'—25', grooves 207, within which I place a fillet of suitable yielding material such as soft metal or putty against which the beveled edges of the plate glass which I employ bear, and the panes are held firmly but somewhat yieldingly in contact with the fillet by means of spring members 208, shown more particularly in Figs. 9 and 10, which are secured at their middle portions by screws 209 and bear at their ends upon the glass. By this means the panes are securely but yieldingly held on both sides and breakage thereof is to a large extent prevented.

I have now described the various features of my invention in detail with reference to the specific form of scale in which they are here shown, but it will be understood that it is not limited to such form but only as pointed out in the following claims.

I claim:

1. In a computing scale, a casing comprising end members, frames 82—83 connecting the end members, a top cover 84, a cylindrical chart mounted for rotation within the casing and end caps covering the ends of the casing.

2. In a computing scale, a cylindrical chart, a casing within which the chart is mounted comprising end members, a cover and frames 82—83 connecting the end members, hinged cover plates for the longitudinal frames having sight openings therein and end caps for the casing.

3. In a computing scale, a casing, a cylindrical chart mounted therein, a shaft rotatably mounted in the casing upon which the chart is secured, friction disks upon which the shaft rests, dust plates 62 arranged to cover the ends of the shaft and the pivots of the disks and having horizontal extensions 64 extending over the disks and the ends of the shaft.

4. In a computing scale, a casing, a cylindrical chart mounted therein, a shaft rotatably mounted in the casing upon which the chart is secured and friction disks upon which the shaft rests, dust plates arranged to cover the ends of the shaft, adjustable means mounted upon the dust plates and extending above and close to the ends of the shaft, to prevent the displacement of the latter.

5. In a computing scale, a casing, a computing cylindrical chart mounted for revolution within the casing, plates 95 at opposite ends of the casing, each provided at one edge with a notch and at the other edge with a pair of struck-up fingers and a wire constituting the reading line stretched between the plates and extending through the notches and secured at its ends around the fingers.

6. In a device of the class described comprising electric lights and a pendulum, a switch in the circuit of the lights comprising a stationary contact and an upwardly extending leaf spring arranged within the path of a portion of the pendulum member and adapted to be held thereby out of contact with its stationary member, when the pendulum is normal.

7. In a pendulum scale having an indicating mechanism, an electric lighting circuit therein, a switch included in the lighting circuit comprising an adjustable stationary contact and a vertically mounted spring contact member, an arm upon the pendulum adapted when the pendulum is in normal position to hold the switch open, and an adjustable buffer for limiting the stroke of the pendulum.

8. In a device of the class described, the combination of a beam, a rotary cylinder chart, connections between the beam and the chart for operating the latter, including a pinion upon the chart and a rack connected to the beam, the rack being jointed intermediate its ends to permit a slight adjustment with relation to the pinion, the joint consisting of a pivot connecting the overlapping ends of the sections and a pin connected to one and loosely extending through the other.

9. In a weighing scale, a base, standards upon the base, a beam mounted upon the standards, a load receiver pivotally mounted upon the beam, means for counterbalancing the load, and plates adapted to be secured to the standards and extending beneath the load receiver and supporting the latter with its knives out of contact with their bearings.

10. In a weighing scale, the combination of a base, standards thereon, a beam pivoted on the standards and provided with knife edges, a load receiver adapted to be carried upon the knife edges, means for counterbalancing the load, downwardly projecting ribs upon opposite sides of the goods receiver, plates adapted to be secured to the standards and provided with grooves which receive the ribs on the goods receiver and retain the bearings of the latter from engagement with their knife edges.

11. In a weighing scale and in combination with the main beam thereof, a tare beam, a tare weight adjustable with relation to the beam, stationary sheaves at opposite ends of the tare beam, a belt connected to the weight and passing around the sheaves, and an idler sheave, a pivoted arm carrying said pulley and spring pressed against the belt.

12. In a self illuminated scale, in combination, a pendulum, a lighting circuit, and a self closing switch in said circuit, said switch arranged to be opened by contact with the pendulum in the movement of the pendulum to its lowermost position.

13. In a scale, in combination, load-offsetting mechanism, including a pendulum, an auxiliary electric device including a self closing switch, said switch comprising a resilient contact member, and means operated by movement of said pendulum to its lowermost position to flex said resilient contact member and thereby open said switch.

14. In a scale, in combination with the weighing mechanism thereof, an illuminating circuit, a self closing switch in said illuminating circuit, said switch comprising a resilient contact member and a non-resilient contact member, and means operated by movement of said weighing mechanism to zero position to flex said resilient member and thereby open the switch.

15. In a weighing scale and in combination with the main beam thereof, a tare beam, a tare weight adjustable with relation to the beam, stationary sheaves at opposite ends of the tare beam, one of said sheaves carrying means to indicate the counterbalancing effect of the tare weight, a belt connected to the weight and passing around the sheaves, and a pivoted arm having an idler sheave mounted thereon and spring pressed against the belt.

16. In a weighing scale and in combination with the main beam thereof, a tare beam, a tare weight adjustable with relation to the beam, sheaves at opposite ends of the tare beam, one of said sheaves being manually turnable, a belt connected to the weight and passing around the sheaves, and a pivoted arm having an idler sheave mounted thereon and spring pressed against the belt.

17. In a weighing scale and in combination with the main beam thereof, a tare beam, a tare weight adjustable with relation to the beam, sheaves at opposite ends of the tare beam, one of said sheaves being manually turnable and carrying means to indicate the counterbalancing effect of the tare weight, a belt connected to the weight and passing around the sheaves, and a pivoted arm having an idler sheave mounted thereon and spring pressed against the belt.

LEWIS CALVIN WETZEL.

Witnesses:
F. A. CROWLEY,
J. D. BURKHOLDER.